Patented Oct. 5, 1943

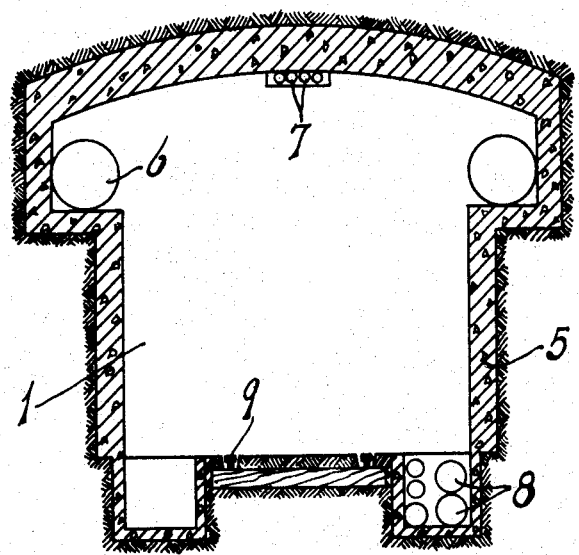
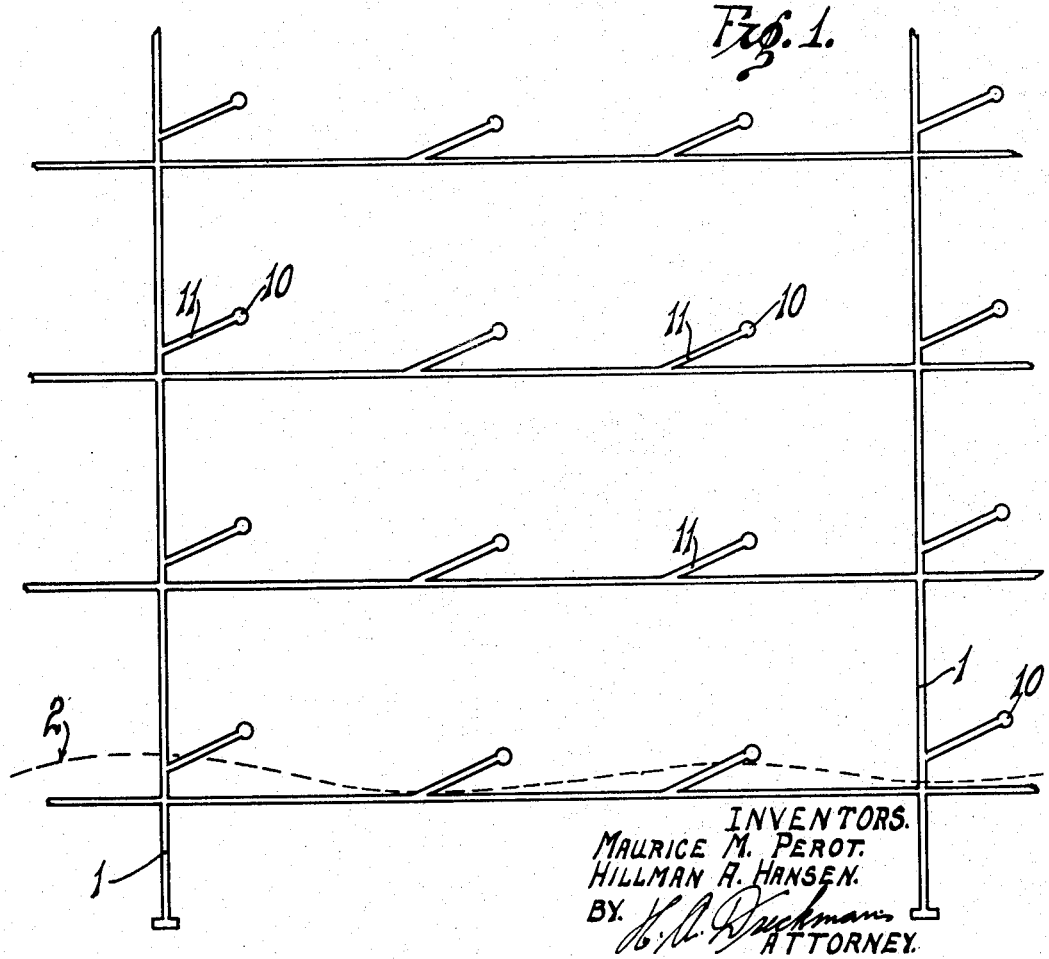

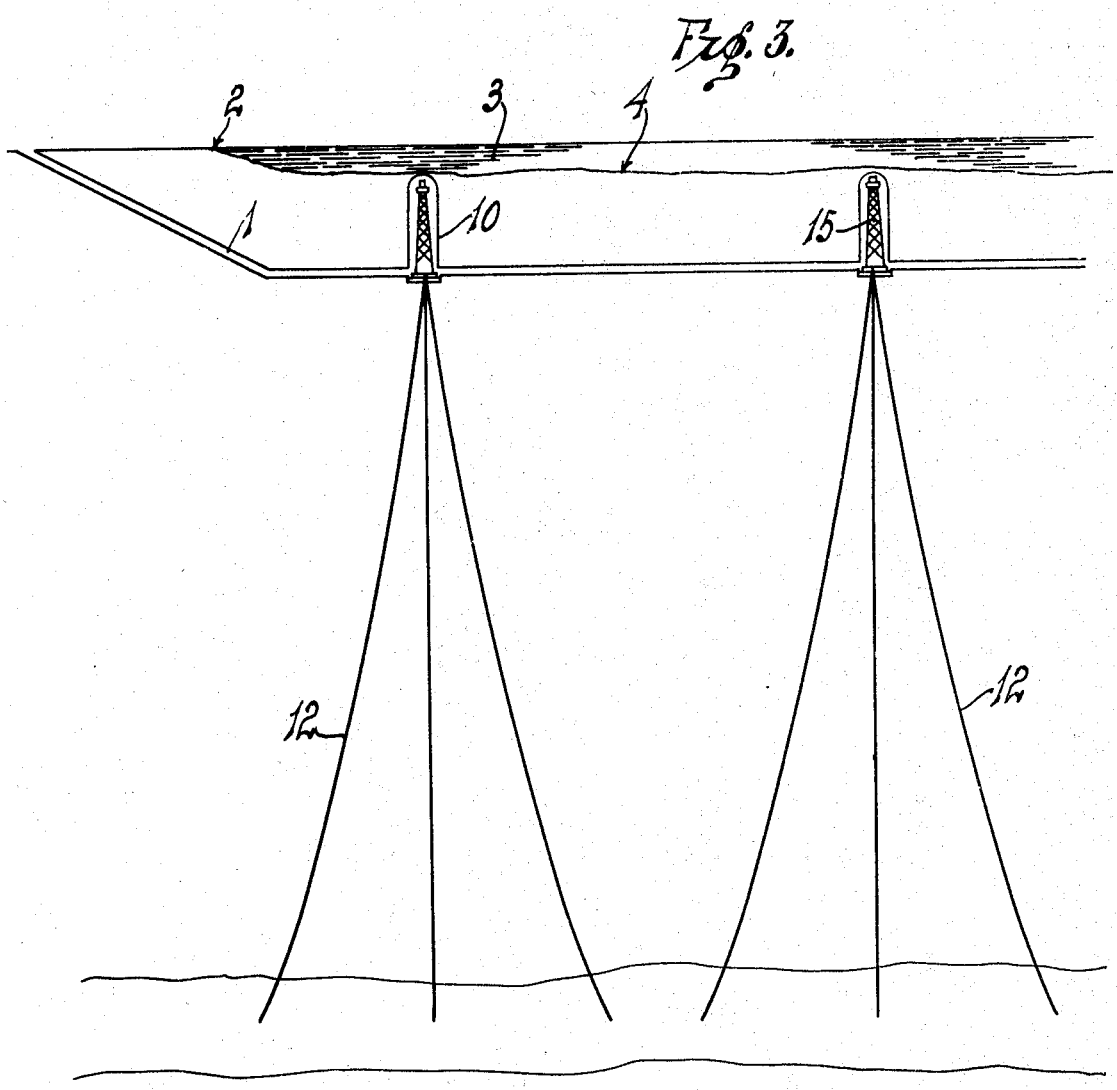

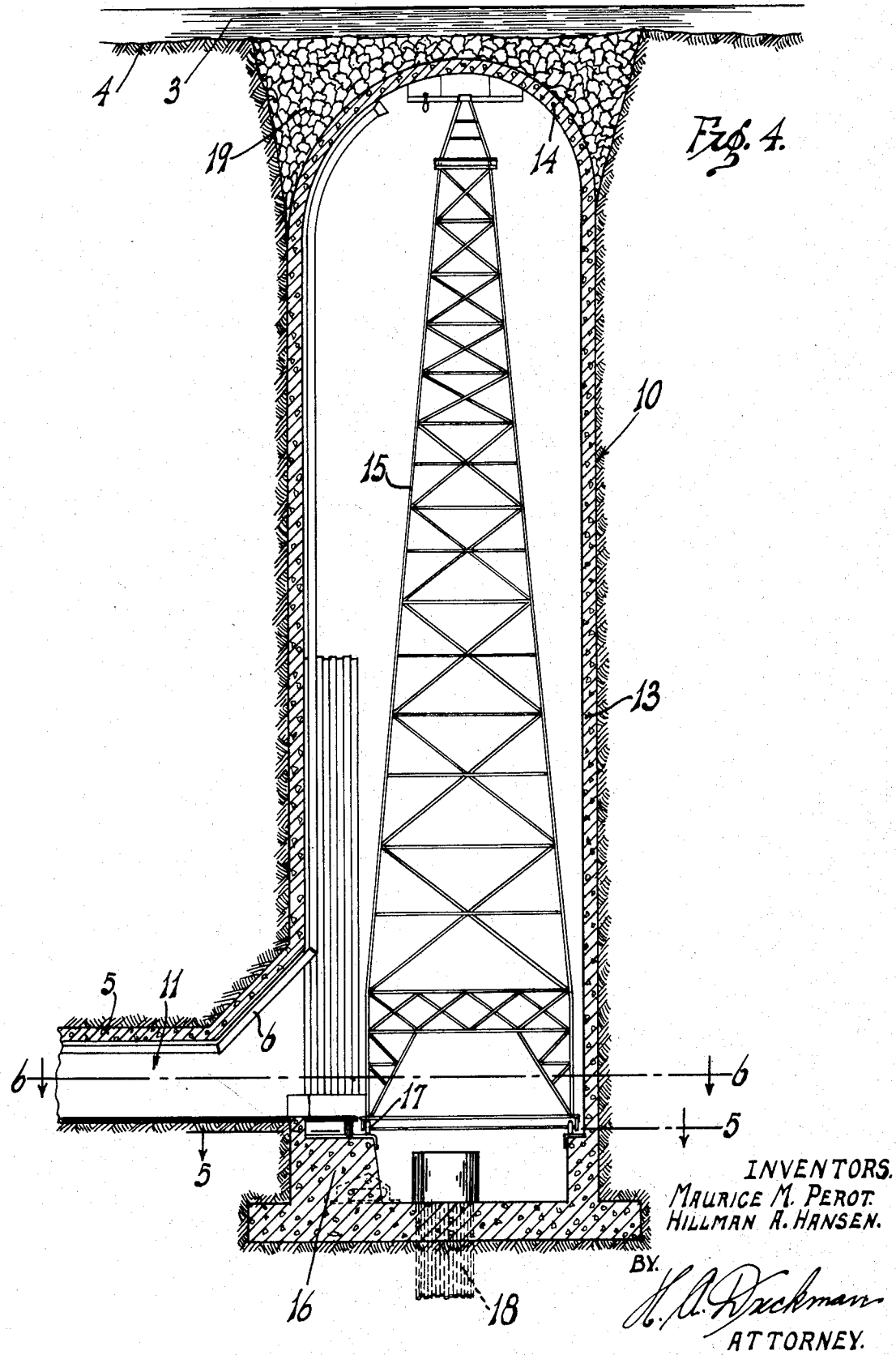

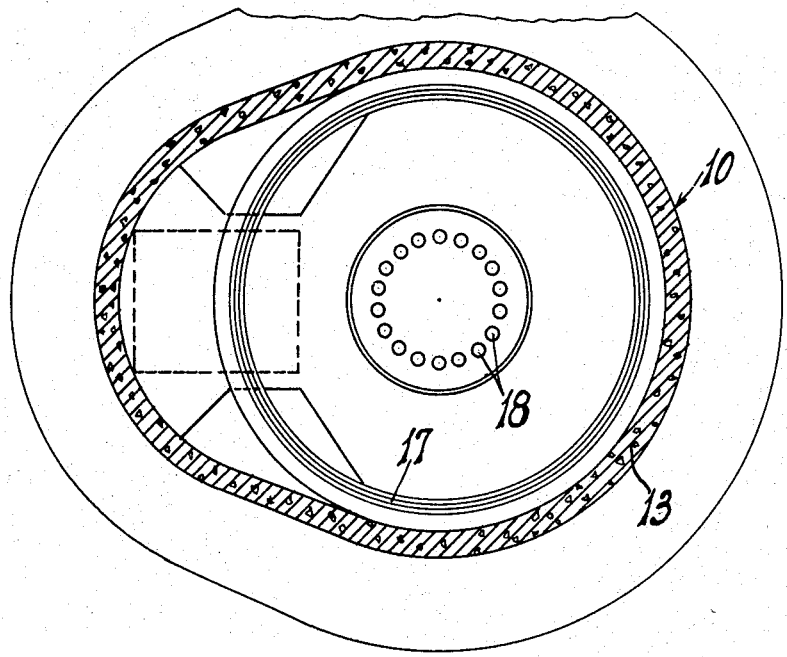
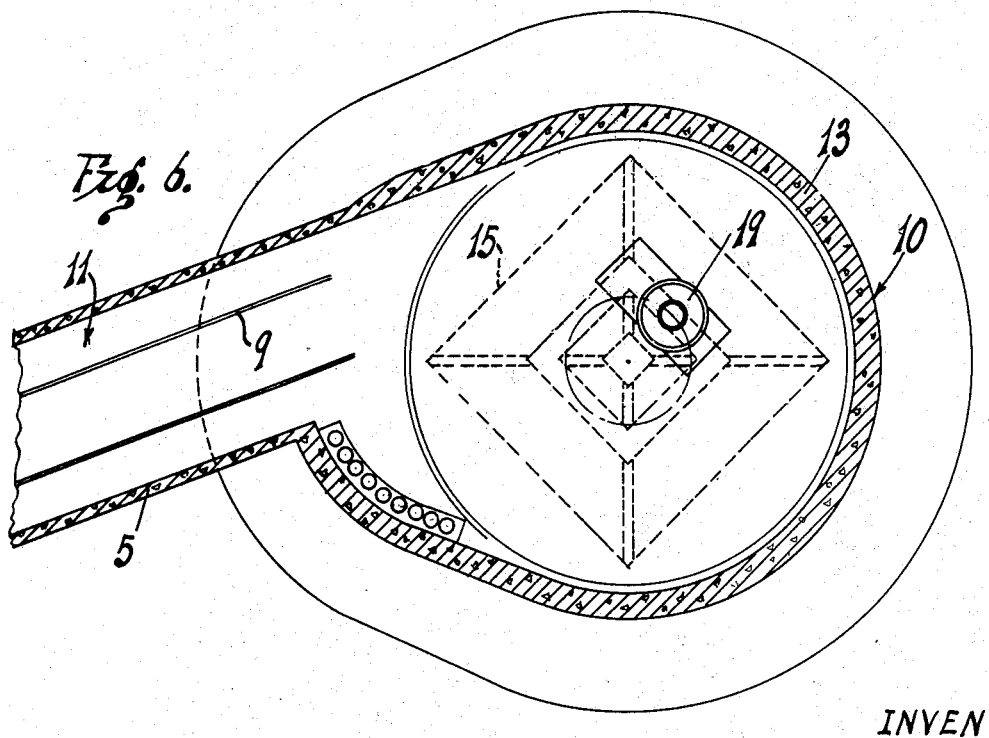

2,331,072

UNITED STATES PATENT OFFICE 2,331,072

METHOD AND MEANS OF DEVELOPING OIL FIELDS

Hillman A. Hansen, Long Beach, and Maurice M. Perot, San Francisco, Calif., assignors of one-third to Carl E. Cameron, Long Beach, Calif.

Application January 24, 1941, Serial No. 375,820

10 Claims. (Cl. 262—1)

This invention relates to a method and means of developing and producing crude petroleum, gas, and other hydrocarbon substances from those lands submerged under water or otherwise inaccessible to surface drilling operations, the subterranean reaches, or portions of which contain or are underlaid and interspersed with sands, strata, or structures saturated with and productive of crude petroleum, gas and other hydrocarbon substances.

An object of our invention is to provide a novel method and means of developing and producing crude petroleum, gas, and other hydrocarbon substances from those lands submerged under water or otherwise inaccessible to surface drilling operations, the subterranean reaches, or portions of which contain or are underlaid and interspersed with sands, strata, or structures saturated with and productive of crude petroleum, gas, and other hydrocarbon substances, which consists in sinking or digging, and erecting or constructing a dome or shaft, cylindrical or rectangular in form, with walls and ceiling of reinforced concrete, steel, or the like, within the earth below the surface of the land or ground where the surface is submerged beneath the water or is otherwise inaccessible to surface drilling operations, having an opening or aperture connected at the base by tunnel or a system of tunnels from a convenient surface point, capable of containing and designed to house an oil well drilling rig together with all machinery, apparatus, and equipment necessarily used in the drilling and operation of oil wells and in drilling thereby an oil well, bore, or hole vertically downward or deflected at an angle to such underlying sands, strata or structures.

Another object of our invention is to provide a novel method and means of developing and producing crude petroleum, gas and other hydrocarbon substances from those lands submerged under water or otherwise inaccessible to surface drilling operations the subterranean reaches, or portions of which contain or are underlaid and interspersed with sands, strata, or structures saturated with and productive of crude petroleum, gas, and other hydrocarbon substances, which consists in driving a tunnel or tunnels from an appropriate or available surface location or locations through the earth beneath the surface to the base or bases of the dome or domes or shaft or shafts sunk or dug into and constructed within the earth either directly or by access tunnels driven from a main tunnel to the base of each such dome or shaft, where two or more such domes or shafts are served by a single tunnel from a shore or island location, which said dome or shaft, domes or shafts contain or house the drilling rig or rigs, apparatus machinery and equipment with which a well or wells may be drilled or sunk into the underlying sand, stratum, or structure containing crude petroleum, gas, and other hydrocarbon substances.

Another object consists in constructing such dome or shaft, domes or shafts, within the earth under the surface thereof, in such a way that an overlying body of water or structures erected upon the ground are not disturbed, each sufficiently large to accommodate, house, or contain a complete drilling rig, machinery, and equipment, in connecting or joining the base or bases thereof to an access tunnel, which in turn connects or joins with a main tunnel leading from a tunnel portal on the shore or some accessible point or location, through which conduits, pipes, and lines are run to supply air and power, and form a ventilating system, and to remove crude petroleum, gas, and hydrocarbon substances from wells drilled in said dome or shaft, the whole being operated as a single unit, the number of domes or shafts and access tunnels and the extent of the main or interconnecting tunnel depending upon the area of productivity.

A feature of our invention resides in the novel method and means of developing and producing crude petroleum, gas, and other hydrocarbon substances from those lands submerged under water or otherwise inaccessible to surface drilling operations as previously stated, where surface drilling and operating equipment would constitute and be a hazard to navigation or a source of pollution to beaches or the shoreline, and where operating equipment would constitute and be a hazard to navigation or a source of pollution to beaches or the shoreline.

Another feature of our invention resides in the novel method and means of producing crude petroleum, gas, and other hydrocarbon substances from those lands submerged under water or otherwise inaccessible to surface drilling operations as previously stated in that as ordinarily used all equipment, apparatus, and machinery used for drilling and production purposes is erected and placed upon the surface of the ground whereas under our system the same is contained in a dome or shaft, cylindrical or rectangular in form, and a connecting tunnel or system of tunnels within the earth removed from sight and immune from aerial or other observation, attack, or destruction.

Another feature of our invention resides in the ability to drill a plurality of wells, bores, or holes to the said stratum or structure productive of crude petroleum, gas, and other hydrocarbon substances, forming at the surface a circle with relation to each other, from a single derrick structure mounted on a rotating platform located and based in a dome or shaft, cylindrical or rectangular in form, within the earth beneath the surface of the ground by whipstocking or deflecting such wells in their downward course in various directions from their respective locations, and so spaced on entering or penetrating the productive sand, stratum, or structure as to cover a comparatively large area.

An advantage of our method and means of developing and producing crude petroleum, gas, and other hydrcarbon substances from those lands submerged beneath the water or otherwise inaccessible to surface drilling operations lies in the fact that extensive sands, strata, or structures highly saturated with immense deposits of crude petroleum, gas, and other hydrocarbon substances otherwise deemed inaccessible by present known drilling and operating methods and considered lost and unovailable for production are made accessible and capable of being produced and of yielding up for use in commerce, trade, and industry vast quantities of crude petroleum, gas, and other hydrocarbon substances at a cost comparatively small with relation to the value of the crude petroleum, gas, and other hydrocarbon substances capable of being produced and saved thereby.

Other objects, features, and advantages of our invention may appear from the accompanying drawings or subjoined detailed description and the appended claims.

In the drawings:

Figure 1 is a diagrammatic plan view of an oil field developed according to our method.

Figure 2 is a transverse sectional view of one of the access tunnels.

Figure 3 is a diagrammatic longitudinal sectional view illustrating the method of drilling from submerged locations.

Figure 4 is a longitudinal sectional view of one of the caissons.

Figure 5 is a sectional view taken on line 5—5 of Figure 4.

Figure 6 is a sectional view taken on line 6—6 of Figure 4.

It is a known fact that lands underlaid and interspersed with sands, strata, and structures saturated with and containing crude petroleum, gas, and other hydrocarbon substances extend from and lie submerged off various sections of the coasts of the United States, and more particularly those of the States of California, Louisiana, and Texas. These lands are of vast extent, having immense potential oil reserves. In other areas the surface of lands valuable for their underlying crude petroleum, gas, and other hydrocarbon content are utilized for cities, upon which buildings and enormous structures have been erected. In the former instance the bodies of water overlying such lands are navigable and in many sections so deep, and in the latter the cities so intensely populated and the structures so built and imposed upon such lands so large and valuable, as to render oil well drilling operations from surface locations impossible, or at least undesirable and impracticable.

Our method consists primarily of sinking shafts into the ocean floor or ground surface at appropriate distances one from the other by means of caissons, and upon each shaft being dug or sunk, of sealing or inclosing the same so as to constitute a dome or shaft cylindrical or rectangular in form in the earth with walls and a domed ceiling constructed of reinforced concrete, impervious to water seepage or deteriorating forces, sufficiently deep and large to house, hold, or accommodate an oil well drilling rig together with all machinery, apparatus, and equipment used in operating the same, the drilling rig being erected upon a table revolving upon a track in such a way that a series of wells, for example, up to the number of eighteen (18) with a thirteen (13) inch surface casing might be drilled from the same derrick and track location without moving the foundation or track, forming a circle when viewed with relation to each other, and of driving a tunnel or tunnels from a fixed point or points on the shore or an island location or locations to the base of each such drilling dome or shaft, or an access tunnel from the tunnel serving and connecting two or more such domes or shafts, such access tunnels extending to each such drilling dome or shaft and the connecting tunnels together with the drilling dome, or shaft, and the drilling and operating equipment, apparatus, and machinery forming a complete and connected unit for the production of crude petroleum, gas, and other hydrocarbon substances from a given area, the tunnel or tunnels being so arranged as to carry conduits for a supply of fresh air being constantly maintained throughout the unit and pipe lines for the removal of crude petroleum, gas, and other hydrocarbon substances produced by such drilling operations.

One or more main tunnels 1 are driven from the shore outwardly into the oil field which lies submerged beyond the shoreline 2. The ocean, bay, lake, river, or the like, overlying the field is indicated at 3. The tunnel 1 is driven into the field a substantial distance below the ocean floor or bed of water. The tunnels 1 are of sufficient size to permit drilling equipment, pipe, and the like, to be transported through them. These tunnels are preferably lined with reinforced concrete, as shown at 5, and provisions made for various utilities such as the air conduits 6, line and power lines 7 and oil lines 8. A track 9 may also be provided in the tunnel for the purpose of transporting various heavy equipment needed during the drilling or production operations of the field. At spaced intervals throughout the field we provide domes or shafts cylindrical or rectangular in form 10 which are connected to the main tunnels 1 through access tunnels 11. These access tunnels are generally of the same design as the main tunnels 1, and give access to the various drilling locations which are spaced throughout the field in a manner shown in Figure 1, although other patterns may be used if desired.

A plurality of wells, holes, or bores 12 are drilled from each such dome or shaft location 10, and these wells, holes, or bores, may, if desired, be whipstocked in various directions from the central location so that a large area can thus be developed from a single dome or shaft caisson. As an example it is conceivable that an area of ninety (90) acres, more or less, can be developed from a single drilling location. Each drilled well, hole, or bore could cover and produce an area of approximately five (5) acres. The vertical domes or shafts 10 are also preferably of reinforced concrete construction as shown at 13, and are closed at the top as shown at 14. These domes or shafts may be sunk or constructed from the surface into a dredged or drilled hole of sufficient depth to accommodate and house a complete oil well drilling rig so that the main and access tunnels 1 and 11 are a considerable distance below the ocean floor 4. The access tunnel 11 extends substantially into the bottom of the dome or shaft 10 as shown in Figures 3 and 4, and also preferably extends into the dome or shaft on a tangent as shown in Figure 6. The reason for this arrangement is to enable machinery, pipe, and the like to be moved into the caisson with the least possible difficulty.

A derrick 15 is assembled in the dome or shaft 10, and is supported on the heavy foundation 16 of the dome or shaft. The derrick 15 is preferably mounted on a track 17 so that it can be rotated to permit the drilling of a plurality of spaced wells, holes, or bores as shown at 18. To enable the wells, bores, or holes 18 to be drilled in the manner shown the drilling table 19 is offset from the center of the derrick on the circumference of a rather large circle, the center of which is substantially in the center of the derrick. If it is desired a single well naturally can be drilled from each location. After the dome or shaft 10 has been set in position the top 14 is preferably below the floor of the ocean 4, and the area above the dome 10 is covered with sand, rock, or the like as shown at 19. The purpose of this is to prevent injury to the dome or shaft 10 from any extraneous force applied to the surface directly above the ceiling of the dome or shaft.

Having described our invention, we claim:

1. The method of carrying on drilling operations to extract gas or petroleum from its natural state by means of shafts, tunnels, and from those lands submerged under water or otherwise inaccessible to surface drilling operations, the subterranean portions of which contain sands, strata, or structures productive of crude petroleum, gas, and other hydrocarbon substances which consists in sinking and erecting within the earth below the surface of such submerged or otherwise inaccessible lands an oil well drilling dome, and then extending an access tunnel from the surface into said dome, said dome and tunnel being a material distance above the petroleum bearing strata.

2. The method of carrying on drilling operations to extract gas or petroleum from its natural state by means of shafts, tunnels, and from those lands submerged under water or otherwise inaccessible to surface drilling operations, the subterranean portions of which contain sands, strata, or structures productive of crude petroleum, gas, and other hydrocarbon substances consists in sinking and erecting within the earth below the surface of such submerged or otherwise inaccessible land a drilling dome, then driving a tunnel from the ground surface at a remote point, then driving an access tunnel from the first named tunnel to and into the said drilling dome, said dome and tunnel being a material distance above the petroleum bearing strata.

3. The method of carrying on drilling operations to extract gas or petroleum from its natural state by means of shafts, tunnels, and from those lands submerged under water or otherwise inaccessible to surface drilling operations, the subterranean portions of which contain sands, strata, or structures productive of crude petroleum, gas, and other hydrocarbon substances which consists in sinking into and erecting in submerged or other subsurface ground a dome substantially cylindrical in form, being closed at the top, then driving a tunnel from the surface of the ground at a remote point to and into said dome, said dome and tunnel being a material distance above the petroleum bearing strata.

4. The method of carrying on drilling operations to extract gas or petroleum from its natural state by means of shafts, tunnels, and from those lands submerged under water or otherwise inaccessible to surface drilling operations, the subterranean portions of which contain sands, strata, or structures productive of crude petroleum, gas, and other hydrocarbon substances consists in sinking and erecting a dome substantially cylindrical in form, in submerged or subsurface ground, the dome being closed at the top, the top of said dome being below the level of the floor of the submerged area or beneath the surface of the ground, then filling in over the top of the dome, and then driving a tunnel from a remote point to and into said dome, said dome and tunnel being a material distance above the petroleum bearing strata.

5. The means of carrying on drilling operations for crude petroleum, gas, and other hydrocarbon substances from those lands submerged under water or otherwise inaccessible to surface drilling operations, the subterranean portions of which contain sands, strata, or structures productive of crude petroleum, gas, and other hydrocarbon substances including a dome substantially cylindrical in form, erected within the earth below the surface of such submerged or otherwise inaccessible lands, closed at the top, an access tunnel extending from the surface of the ground to and into the dome and a derrick in said dome, utility conduits extending through the access tunnel into the dome, said access tunnels extending substantially tangential into the dome and a derrick in the dome.

6. The means of carrying on drilling operations for crude petroleum, gas, and other hydrocarbon substances from those lands submerged under water or otherwise inaccessible to surface drilling operations, the subterranean portions of which contain sands, strata, or structures productive of crude petroleum, gas, and other hydrocarbon substances including a dome substantially cylindrical in form, erected within inaccessible lands, being closed at the top, an access tunnel extending from the surface of the ground to and into the dome, and a derrick in said dome, utility conduits extending through the access tunnel into the dome, said access tunnels extending substantially tangential into the dome, and a derrick in the dome, and means rotatably mounting the derrick in the dome whereby a plurality of well bores may be drilled from the dome.

7. The means of carrying on drilling operations for crude petroleum, gas, and other hydrocarbon substances from those lands submerged under water, or otherwise inaccessible to surface drilling operations, the subterranean portions of which contain the sands, strata, or structures productive of crude petroleum, gas, and other hydrocarbon substances which consists in a plurality of domes erected within the earth below the surface of the ground, the top of each of the domes being sealed and closed, said domes being covered over the top exterior surface thereof and even with the ground, or earth, the walls and ceilings of each of the domes being formed of reinforced concrete and each of the domes being sufficiently large to accommodate a complete oil well drilling rig, machinery, and equipment, a tunnel extending from a remote point on the surface to a level with the base of each dome, a main tunnel connecting two or more of said domes, an access tunnel extending into the base of each of the domes, the juncture of the access tunnel and the dome being constructed with an elevated ceiling to permit the passage of pipe and drilling equipment into the dome, a circular track on the base of each of said domes, a rotatable derrick floor mounted on said circular track, and an oil well drilling rig mounted on the derrick floor, a system of ventilators, conduits and pipes installed in the tunnels and the domes for transmission of power and removal of oil and gas to the surface, whereby a plurality of wells for the production and removal of crude petroleum, gas and the like, may be drilled with a single derrick in said dome, said derrick being rotated on the track an appropriate distance for each successive well.

8. The method of carrying on drilling operations to extract gas or petroleum from its natural state by means of shafts and tunnels, and from those lands submerged under water or otherwise inaccessible to surface drilling operations, the subterranean portions of which contain sands, strata, or structures productive of crude petroleum, gas, and other hydrocarbon substances, which consists in sinking and erecting within the earth below the surface of such submerged or otherwise inaccessible lands an oil well drilling dome, and then extending an access tunnel from the surface into said dome, said dome and tunnel being a material distance above the petroleum bearing strata, and then drilling a well from said dome into the oil productive strata.

9. The method of carrying on drilling operations to extract gas or petroleum from its natural state by means of shafts and tunnels, and from those lands submerged under water or otherwise inaccessible to surface drilling operations, the subterranean portions of which contain sands, strata, or structures productive of crude petroleum, gas, and other hydrocarbon substances consists in sinking and erecting within the earth below the surface of such submerged or otherwise inaccessible land a drilling dome, then driving a tunnel from the ground surface at a remote point, then driving an access tunnel from the first named tunnel to and into the said drilling dome, and then drilling a well from said dome into the oil productive strata.

10. The method of carrying on drilling operations to extract gas or petroleum from its natural state by means of shafts and tunnels, and from those lands submerged under water or otherwise inaccessible to surface drilling operations, the subterranean portions of which contain sands, strata, or structures productive of crude petroleum, gas, and other hydrocarbon substances which consists in sinking into and erecting in submerged or other subsurface ground a dome substantially cylindrical in form, being closed at the top, then driving a tunnel from the surface of the ground at a remote point to and into said dome, and then drilling a well from said dome into the oil productive strata.

HILLMAN A. HANSEN.
MAURICE M. PEROT.